US007421154B2

(12) United States Patent
Kinjo

(10) Patent No.: US 7,421,154 B2
(45) Date of Patent: Sep. 2, 2008

(54) IMAGE PROCESSING METHOD

(75) Inventor: Naoto Kinjo, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 437 days.

(21) Appl. No.: 10/875,380

(22) Filed: Jun. 25, 2004

(65) Prior Publication Data
US 2004/0236791 A1 Nov. 25, 2004

Related U.S. Application Data

(62) Division of application No. 09/617,309, filed on Jul. 14, 2000, now Pat. No. 6,813,395.

(30) Foreign Application Priority Data

Jul. 14, 1999 (JP) ................................. 11-200572
Jul. 23, 1999 (JP) ................................. 11-208493

(51) Int. Cl.
G06K 9/54 (2006.01)
G06K 9/20 (2006.01)
G06F 7/00 (2006.01)
G06K 9/36 (2006.01)

(52) U.S. Cl. .................... 382/305; 382/282; 707/3; 707/6

(58) Field of Classification Search ................ 382/305, 382/282, 286, 291, 203, 218, 219, 283, 295, 382/296; 707/3, 6, 7
See application file for complete search history.

(56) References Cited

U.S. PATENT DOCUMENTS 5,557,688 A * 9/1996 Nakamura .................. 382/164
5,579,471 A 11/1996 Barber et al.
5,802,361 A 9/1998 Wang et al.

(Continued)

FOREIGN PATENT DOCUMENTS

JP 4-346332 12/1992

(Continued)

OTHER PUBLICATIONS

Rikimaru, "Konica Landmaster GPS-mounted Camera," *Photographic Industry*, 1996-1997, pp. 12-15 and pp. 84-87 (w/ concise English language translation).

(Continued)

*Primary Examiner*—Yon J. Couso
(74) *Attorney, Agent, or Firm*—Sughrue Mion, PLLC

(57) ABSTRACT

The image searching method extracts or recognizes specific information for an image that exists in the image and/or accompanies it, allows either the specific information itself or related information thereof to be appendant to image data for the image, stores the image data as well as either information appendant to the image data as accessory information in a database, designates at least a portion of the accessory information as a searching condition, searches through the database under the designated searching condition, determines a degree of agreement with the accessory information appendant to a selected image data and reads an image having the degree of agreement not lower than a predetermined value. The image processing method utilizes the image searching method. These methods are capable of efficient image detection or search using as a key specific information such as the shape of subjects.

7 Claims, 7 Drawing Sheets

U.S. PATENT DOCUMENTS

| | | | |
|---|---|---|---|
| 6,078,915 | A | 6/2000 | Okawa et al. |
| 6,169,998 | B1 | 1/2001 | Iwasaki et al. |
| 6,243,713 | B1 | 6/2001 | Nelson et al. |
| 6,411,953 | B1 | 6/2002 | Ganapathy et al. |
| 6,477,269 | B1 | 11/2002 | Brechner |
| 6,603,885 | B1 * | 8/2003 | Enomoto .................... 382/263 |

FOREIGN PATENT DOCUMENTS

| | | |
|---|---|---|
| JP | 5-174057 A | 7/1993 |
| JP | 6-160993 | 6/1994 |
| JP | 7-21198 | 1/1995 |
| JP | 8-095998 A | 4/1996 |
| JP | 8-249352 | 9/1996 |
| JP | 9-037203 A | 2/1997 |
| JP | 9-138471 | 5/1997 |
| JP | 9-163276 A | 6/1997 |
| JP | 9-204444 A | 8/1997 |
| JP | 9-322109 A | 12/1997 |
| JP | 10-162130 | 6/1998 |
| JP | 11-66355 A | 3/1999 |
| JP | 11-85992 A | 3/1999 |

OTHER PUBLICATIONS

Kosugi et al., "Retrieval of Similar Faces by Using Coarse and Fine Gray-Level Mosaics," *Journal of the Institute of Electronics, Information and Communication Engineers*, vol. J80-D-II, (1997), No. 8, pp. 2218-2224 (w/ concise English language translation).

Sohma et al., "Robust Face Recognition under Drastic Changes of Conditions of Image Acquisition," *Journal of the Institute of electronics, Information and Communication Engineers*, (1997), vol. J80-D-II, No. 8, pp. 2225-2231 (w/ concise English language translation).

Simon Clippingdale, A Unified Approach to Video Face Detection, Tracking and Recognition, IEICE Technical Report, vol. 98, No. 528, pp. 61-68, Japan, Jan. 22, 1999.

* cited by examiner

SHOOTING DIRECTION

DESIGNATING DISTANCE RANGES

IMAGE PROCESSING METHOD

This is a divisional of Application Ser. No. 09/617,309 filed Jul. 14, 2000 now U.S. Pat. No. 6,813,395; the disclosure of which is incorporated herein by reference.

BACKGROUND OF THE INVENTION

This invention relates to an image searching method and an image processing method. More specifically, this invention relates to an image searching method in which specific information extracted from an image such as simple figures or subjects such as human individuals or physical objects or specific information that accompanies the image such as audio information or message information such as characters and marks is stored in a database as accessory information for the image and images are searched through on the basis of the stored accessory information.

The present invention also relates to an image searching method which extracts the subjects of interest on the basis of the position information, camera information and map information that are relevant to the time when the image was taken and which uses the result of extraction (in the form of image) to search through images.

The invention also relates to an image processing method which utilizes such image searching methods or the specific information extracted from the image.

When viewing a portrait, we pay the most attention to the face of the person in the picture. Therefore, when the original image typically recorded on a film is to be printed on a duplicating material such as print paper, the amount of exposure has to be determined such that the face of the person is reproduced in an appropriate color and density.

To meet this requirement of portraiture, Unexamined Published Japanese Patent Application (kokai) No. 346332/1992 proposed a method comprising the steps of dividing an original color image into a multiple of pixels, separating each pixel into three colors R, G and B, performing photometry, constructing histograms about hue and saturation on the basis of the result of photometry, slicing as a human face equivalent area those regions of the histograms which contain pixels having a hue and saturation that correspond to the face of the person in the portrait, and determining the correct exposure on the basis of the photometric data for the sliced regions.

In order to increase the probability for extracting the human face equivalent area, Unexamined Published Japanese Patent Application (kokai) No. 160993/1994 proposed various techniques such as removing the area contiguous to the edges of the image as the background region or transforming the extracted area into a figure defined by lines and determining whether the extracted area corresponds to the face of the person in the portrait on the basis of the shapes of neighboring areas surrounding the extracted area and the shape of the extracted area.

These techniques, however, have a common problem in that if the original image contains the ground, trees and any other areas having a hue and saturation close to those of flesh color, such areas may be erroneously interpreted as the human face equivalent area. If these areas are adjacent the true human face equivalent area, they cannot be correctly separated from the latter, with the result that the original image is not likely to be divided into areas of appropriate sizes.

If the areas other than the face of the person in the portrait are erroneously interpreted as the human face equivalent area or if the areas adjacent the human face equivalent area which have a similar hue and saturation cannot be separated from the latter, it has been impossible to determine the correct exposure for appropriate printing of the true human face.

To solve this problem, it would be effective to utilize not only the color (hue and saturation) of the area of interest but also the information about its shape. Speaking of the human face equivalent area, it will in most cases have an elliptical or oval shape, so this special shape may be added to the color information as a condition for extracting the human face equivalent area.

Thus, the information about the shapes of subjects in the original image is very important to the purpose of image detection or searching. In this connection, reference may be had to the technology disclosed in commonly assigned Unexamined Published Japanese Patent Application (kokai) No. 138471/1997. In this technology, the edges of an image are detected and the lines of contours of an area corresponding to the person in portrait are extracted so that the area, particularly the one corresponding to the face of the person, is rendered to reproduce the preferred color.

According to another prior art image searching system, the image the searcher wants to extract can be searched for without requiring the searcher to draw the image of interest or even if no image close to the one wanted by the searcher is ready at hand or within the list of available images. For this image searching system, reference may be had to Unexamined Published Japanese Patent Application (kokai) Nos. 21198/1995 and 249352/1996.

For use in taking documentary pictures by laymen, cameras have recently been put on the commercial market that provide automatic recording of "when and where" the picture was taken. Those cameras are a composite product in which an artificial satellite based global positioning system (GPS) commonly incorporated in car navigation systems is combined with a direction sensor and a camera [Shashin Kogyo (Photographic Industry), 1996-7, pp. 12-15, 84-87).

While photography has several roles to play, the importance of photo's documentary and evidential performance is one of the essential values of photograph. This is why accessory information telling "when and where" the subject was shot is important to documentary pictures. Conventional cameras have so far provided the information about "when" to some extent but not the information about "when".

In this sense, the camera described as a new product in Shashin Kogyo, supra (which is hereunder sometimes referred to as a GPS incorporating camera) may well be considered a device that can fulfil the inherent functions of documentary pictures. First of all, the dating function of the conventional "dating" camera and the representation of time by the GPS incorporating camera are entirely different in terms of evidential value: the former provides time that can be determined "arbitrarily" (for personal use) whereas the latter records the "official time" being sent from the satellite.

Exactly speaking, the position information provided by the GPS incorporating camera does not tell the position of the subject but indicates the position of the camera and the direction of shooting. Therefore, if the picture is a long shot, the position of the subject is not always definite. Even in this case and if there is a need, the position of the subject can be correctly calculated from, for example, the distance between that subject and another subject in the image.

The present inventors previously proposed in Japanese Patent Application No. 162130/1998 a photographic printing method comprising the steps of acquiring at least one kind of shooting information in association with the image taken that is selected from among shooting position, shooting direction and magnification rate, obtaining additional information associated with at least a portion of the acquired shooting information and adding the obtained additional information to a photographic print. The present inventors also proposed a photographic printing apparatus implementing the method.

Using the photographic printing method and apparatus, the customer looking at the picture can be easily reminded of relevant atmosphere such as the circumstances of shooting on the basis of the shooting information added in association with the recorded picture. Thus, the method and apparatus can not only enhance the documentary function of photographic prints but also allow them to serve the purpose of amusement (by furnishing a topic of conversation).

SUMMARY OF THE INVENTION

The present invention is a further development of the concept of the above-described prior art for detecting areas of interest using specific shapes in the original image as a key. It is therefore the first object of the invention to provide an image searching method capable of efficient image detection or search (which is hereunder collectively referred to as image search) using as a key the shapes of subjects such as a person or a physical object in the original image or specific information that accompanies the original image such as audio information or message information.

The present invention has been accomplished with a view to further facilitating the use of this technology. It is therefore the second object of the invention to provide an image searching method that is applicable when the customer wants to locate a desired image from a number of stored images and which enables easy image search by utilizing the position information, camera information and map information that are relevant to the time when the image was taken and which is added in association with the recorded image.

The third object of the invention is to provide an image processing method which utilizes such image searching methods or the specific information extracted from the original image.

In order to attain the above overall object, the present invention provides an image searching method, comprising the steps of:

extracting or recognizing specific information for an image that either exists in the image or accompanies it or both exists in the image and accompanies it; allowing either the specific information as-obtained or related information relative to the specific information to be appendant to image data for the image; storing the image data as well as either information appendant to the image data as accessory information in a database; designating at least a portion of the accessory information as a searching condition; searching through the database under the designated searching condition; determining a degree of agreement with the accessory information appendant to a selected image data; and reading an image having the degree of agreement not lower than a predetermined value.

In order to attain the first object, the present invention provides an image searching method, comprising the steps of: applying to an image a treatment of extracting M (M$\geq$1) kinds of specific geometric figures predetermined for the image; allowing to be appendant to image data of the corresponding image an accessory information containing a combination of position and size or a combination of position, size and direction or a combination of position, size and color or a combination of position, size, direction and color that correspond to N (N$\geq$0) specific geometric figures that have been obtained as a result of extraction; storing the image data as well as the accessory information appendant to the image data in a database; designating, for L (L is from one to M) kinds of the specific geometric figures, presence or absence of the specific geometric figures or an outline of at least one element selected from among the position, size, direction and color; determining a degree of agreement with the accessory information appendant to image data of the stored image; and reading an image having the degree of agreement not lower than a predetermined value.

Preferably, the specific information existing in the image is M (M$\geq$1) kinds of specific geometric figures predetermined for the image, the related information to be stored as the accessory information is either a combination of position and size or a combination of position, size and direction or a combination of position, size and color or a combination of position, size, direction and color that correspond to N (N$\geq$0) specific geometric figures that have been obtained as a result of extraction by processing the image with a treatment of extracting the M kinds of the specific geometric figures, and the designating step of at least a portion of the accessory information as the searching condition comprises designating, for L (L is from one to M) kinds of the specific geometric figures, presence or absence of the specific geometric figures or an outline of at least one element selected from among the position, size, direction and color.

Preferably, the specific information existing in the image is M (M$\geq$1) kinds of specific subjects predetermined for the image, the related information to be stored as the accessory information is either a combination of position and size or a combination of position, size and direction or a combination of position, size and color or a combination of position, size, direction and color that correspond to N (N$\geq$0) specific subjects that have been obtained as a result of extraction by processing the image with a treatment of extracting the M kinds of the specific subjects, and the step of designating at least a portion of the accessory information as the searching condition comprises designating, for L (L is from one to M) kinds of the specific subjects, presence or absence of the specific subjects or an outline of at least one element selected from among the position, size, direction and color.

Preferably, the image is temporally continuous images, the specific information existing in the image is a specific geometric figure predetermined for the image, the related information to be stored as the accessory information comprises information about the specific geometric figure and a direction of movement of an image corresponding to the specific geometric figure that have been obtained by processing the temporally continuous images by a treatment of extracting the specific geometric figure from the temporally continuous images at predetermined intervals of time or frame numbers and determining the direction of movement of the image corresponding to the geometric figure based on comparison of a position of the extracted specific geometric figure between frames, and the step of designating at least a portion of the accessory information as the searching condition comprises designating, for the temporally continuous images, outlines of the specific geometric figure and the direction of its motion vector at the predetermined intervals of time or frame numbers.

Preferably, the image is temporally continuous images, the specific information existing in the image is a specific subject predetermined for the image, the related information to be stored as the accessory information comprises information about the specific subject and a direction of movement of an image corresponding to the specific subject that have been obtained by processing the temporally continuous images by a treatment of extracting the specific subject from the temporally continuous images at predetermined intervals of time or frame numbers and determining the direction of movement of the image corresponding to the specific subject based on comparison of a position of the extracted subject between frames, and the step of designating at least a portion of the accessory information as the searching condition comprises designating, for the temporally continuous images, outlines of the specific subject and the direction of its motion vector at the predetermined intervals of time or frame numbers.

Preferably, the image has audio information, the specific information accompanying the image is the audio information, the accessory information is the audio information that has been recognized for the image having the audio information, the step of designating at least a portion of the accessory information as the searching condition comprises designating an outline of audio information for the image having the audio information, and the degree of agreement is with speech recognition information that is appendant to the stored image data.

Preferably, the accessory information comprises not only the audio information but also the related information which is either a combination of position and size or a combination of position, size and direction or a combination of position, size and color or a combination of position, size, direction and color which correspond to a specific geometric figure, and the searching condition comprises not only the audio information but also presence or absence of the specific geometric figure or at least one element selected from among position, size, direction and color which correspond to the specific geometric figure.

Preferably, the accessory information comprises not only the audio information but also the related information which is either a combination of position and size or a combination of position, size and direction or a combination of position, size and color or a combination of position, size, direction and color which correspond to a specific subject, and the searching condition comprises not only the audio information but also presence or absence of the specific subject or at least one element selected from among position, size, direction and color which correspond to the specific subject.

Preferably, the specific information which both exists in and accompanies the image is person's information comprising a facial image of a particular person and his or her name, the related information to be stored as the accessory information is presence or absence of the particular person or either a combination of position and size of the particular person or a combination of position, size and direction of the particular person or a combination of position, size and color of the particular person or a combination of position, size, direction and color of the particular person and obtained by the steps of preliminarily registering person's information comprising the facial images of the A particular persons (A≧1) and their names and performing extraction of persons and a person identifying treatment using the person's information at the time of storing the image, the step of designating at least a portion of the accessory information as the searching condition comprising designating presence or absence of B particular persons (B is from one to A) or at least one element selected from among positions, sizes and directions of the particular persons, and the degree of agreement is with the accessory information to each of the stored images.

Preferably, the image is temporally continuous images, and the related information to be stored as the accessory information is obtained by processing the temporally continuous images by the person identifying treatment using the person's information at predetermined intervals of time or frame numbers and comprises information about the particular parsons and a direction of the movement of the particular parsons, the step of designating at least a portion of the accessory information as the searching condition comprising designating presence or absence of the particular persons or at least one element selected from among positions, sizes and colors of the particular persons, and the direction of its motion vector.

Preferably, the image has audio information, the accessory information comprises the related information obtained for the image having the audio information by a person identifying treatment using the person's information and audio information recognized for the image having the audio information, and the step of designating at least a portion of the accessory information as the searching condition comprises designating an outline of the related information containing the presence or absence of the particular persons or at least one element selected from among positions, sizes, directions and colors or the audio information as the searching condition applicable to the image having the audio information.

Preferably, the image has message information, the specific information accompanying the image is the message information, the accessory information is the message information recognized for the image having the message information, the step of designating at least a portion of the accessory information as the searching condition comprises designating an outline of message information for the image having the message information, and the degree of agreement is with message recognition information appendant to the stored image data.

Preferably, the message information is text data or appendant image data.

Preferably, the image is a computer graphics image, the specific information appendant to the image is editing data used to create the image, the accessory information is the editing data, the step of designating at least a portion of the accessory information as the searching condition has the substeps of designating a scene of the computer graphics image by at least one element selected from among position, size and direction of at least one member selected from among a specific geometric figure, a specific physical object and a specific color and automatically transforming the designated scene designation data to a computer graphics command, and the step of determining the degree of agreement is for determining the degree of agreement between the resulting computer graphics command and the editing data appendant to a selected item of the stored image data.

Preferably, the computer graphics image is temporally continuous computer graphics images, the accessory information comprises not only the editing data but also either the specific geometric figure or the specific physical object or both and a direction of movement of an image that have been obtained by determining, for the temporally continuous computer graphics images, the direction of movement of the image corresponding to either the specific geometric figure or the physical object or both at predetermined intervals of time or frame numbers based on comparison between frames of the position of either the specific geometric figure or the specific physical object or both, and outlines of either the specific geometric figure or the specific physical object or both and the direction of their motion vector are designated as the searching condition at predetermined intervals of time or frame numbers for the temporally continuous computer graphics images.

Preferably, the step of designation has the substeps of designating at least a portion of the accessory information by at least one means selected from among symbols, language and speech and automatically transforming at least one designated element selected from among symbols, language and speech into the specific information or accessory information therefore.

Preferably, an area in the image data that meets the searching condition is displayed in temporal preference.

Preferably, an area in the image data that meets the searching condition is displayed as enhanced by a different image processing scheme than applied to the other areas.

Preferably, the image data is processed in accordance with a display performance of a display terminal.

Preferably, the image areas that have been searched through are managed area by area and a priority of reference in search mode is set in accordance with access frequency.

Preferably, the image areas that have been searched through are managed area by area and an image resolution for data storage is set in accordance with access frequency.

In order to attain the second object, the present invention provides an image searching method, comprising the steps of: extracting a name of a shot place where an image was shot or a subject and their position on a map; storing image data of the image as well as an extracting result allowed to be appendant to the image data as accessory information: designating the position or the name of the shot place or the position or the name of the subject as reference data; determining a degree of agreement with the accessory information appendant to image data of the stored image; and reading an image having the degree of agreement not lower than a predetermined value.

Preferably, the specific information accompanying the image is a name of a shot place where an image was shot or a subject and their position on a map, the accessory information is a result obtained by extracting the name of the shot place or the subject and theirs position on the map from shooting information when the image was shot and map information, and the step of designating at least a portion of the accessory information as the searching condition comprises designating the position or the name of the shot place or the position or the name of the subject as reference data.

Preferably, the shooting information is acquired in association with the shot image and is either a first data composition consisting of shooting position or a second data composition consisting of shooting position and shooting direction or a third data composition consisting of shooting position and magnification rate or a fourth data composition consisting of shooting position, shooting direction and magnifying power of shooting.

Preferably, an outline of depth is designated as reference data concerning the shooting position and subject's position by arranging patterned subjects in a virtual map space.

Preferably, the shot place or the position and size of the subject within the screen are extracted and added to the accessory information together with the extracted information.

Preferably, the shot place or the position and size of the subject within the screen are extracted and added to the designated information together with the extracted information.

Preferably, a difference between image data of the actual shot image and image data simulating the shot image and which has been created from position information and camera information when the image was shot, and the map information is stored and when the image which is a result of searching is outputted, the stored difference is added to the image data simulating the shot image and which has been created from the position information, the camera information and the map information and the resulting image is output.

The present invention provides an image searching method, comprising the steps of: deriving information representing a distance from a screen recording an image; storing image data of the image as well as a deriving result allowed to be appendant to the image data of the image as accessory information; designating the information representing the distance from the image recording screen as reference data; determining a degree of agreement with the accessory information appendant to image data of the image; and reading an image having the degree of agreement not lower than a predetermined value.

Preferably, the specific information accompanying the image is information representing a distance from a screen recording the image, the accessory information is a result obtained by deriving the information representing the distance from the image recording screen, and the step of designating at least a portion of the accessory information as the searching condition comprises designating the information representing the distance from the image recording screen as reference data.

Preferably, if the image is a multi-stage focused image or a stereoscopic image, the information representing the distance from the image recording screen is derived from the multi-stage focused image or stereoscopic image.

Preferably, the information representing the distance from the image recording screen is derived from the position information when the image was shot and map information or from the position information, the map information and the camera information.

Preferably, an outline of the depth for each of the areas in the image recording screen is designated as reference data concerning the information representing the distance from the image recording screen.

Preferably, an outline of the depth is designated as reference data concerning the information representing the distance from the image recording screen by arranging patterns of subjects in a virtual map space.

Preferably, a difference between image data the actual recorded image and image data simulating the recorded image and which has been created from position information, camera information and map information that are relevant to a shooting time is stored and to output the image which is a result of searching, the stored difference is added to the image data simulating the recorded image and which has been created from the position information, camera information and map information that are relevant to the shooting time and the resulting image is output.

In order to attain the third aspect, the present invention provides an image processing method, comprising the steps of: extracting specific figures or specific subjects in a printed image during a previous printing; storing the extracted specific figures or subjects in a database as accessory information that is keyed to image processing conditions either alone or in combination with the image data; reading image data from a previous print or captured image data recording medium to extract the specific figures or specific subjects for processing prints upon reorder; determining a degree of agreement between the extracted specific figures or subjects and the accessory information stored in the database; searching for an image having the degree of agreement not lower than a predetermined value; and processing a hit image under the image processing conditions employed for the previous printing.

The present invention provides an image processing method, comprising the steps of: storing image processing conditions for a previous printing in a database in such a manner that they are keyed to image data; reading image data from a previous print or captured image data reading medium to extract a first specific figure or subject for processing prints upon reorder; also extracting a second specific figure or subject from the image data stored in the database; determining a degree of agreement between the first specific figure or subject and the second specific figure or subject; searching for an image having the degree of agreement not lower than a predetermined value; reading from the database the image data for a hit image together with the stored image processing conditions keyed to the image data; and subjecting the thus read image data to image processing under the image processing conditions as read from the data base.

The present invention provides an image processing method, comprising the steps of: extracting specific figures or specific subjects from a plurality of images within a single order; and performing image processing of image frames to yield prints that are finished to have quality within a predetermined range if the image frames are similar in terms of positions and sizes of the specific figures or subjects.

DETAILED DESCRIPTION OF THE INVENTION

The image searching method and image processing method of the invention are described below in detail with reference to the preferred embodiments shown in the accompanying drawings.

First, by referring to FIGS. 1-9, we describe in detail the image searching method according to the first embodiment of the invention and the image processing method according to the third embodiment of the invention.

Figure 1:
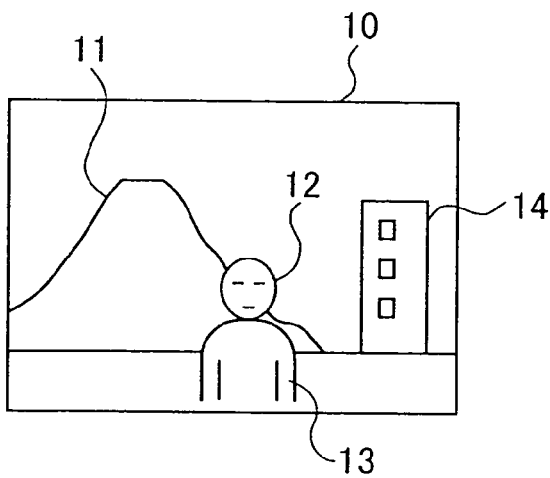
FIG. 1 shows an original image which is to be searched through by an image searching method according to an example of the invention.
Figure 2:
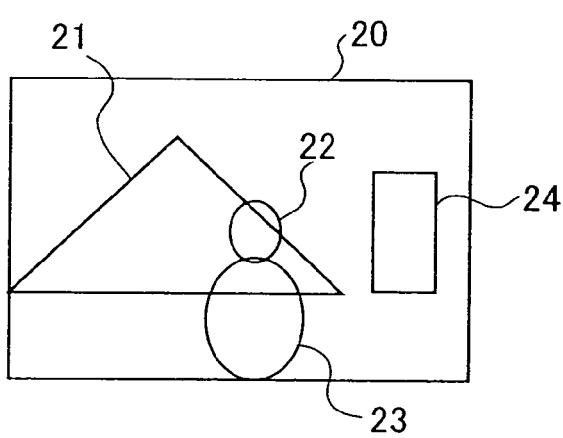
FIG. 2 shows a designated searching pattern entered by the user to search through the original image shown in FIG. 1.
Figure 3:
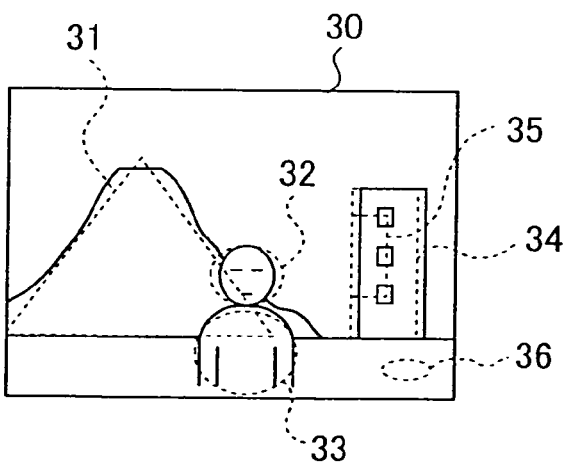
FIG. 3 shows the original image of FIG. 1 with extracted specific figures superposed thereon.

FIGS. 1-3 are each intended to illustrate the image searching method according to an example of the first embodiment of the invention. FIG. 1 shows an original image 10 that is supplied from an image data source (not shown) and the image data for which is to be stored in memory means such as a database (not shown). FIG. 2 shows a designated searching pattern 20 which the user has designated with an image designating device (not shown) by, for example, manual drawing on a tablet typically with a pen or by inputting to an image input device or graphically inputting to an image display device, typically by means of a mouse or from a keyboard. FIG. 3 shows the result 30 of extracting predetermined specific geometric figures (e.g. circles, triangles and rectangles which are hereunder referred to simply as specific figures) from the original image 10 in FIG. 1 by the program for the image searching method according to the example under consideration using a suitable technique such as pattern matching.

It is also possible to detect various specific shapes by other techniques such as the edge tracing method disclosed in commonly assigned Unexamined Published Japanese Patent Application (kokai) No. 138471/1997, supra.

In the original image 10 shown in FIG. 1, numeral 11 represents a triangular mountain, 12 and 13 represent the face and the trunk, respectively, of a person, and 14 represents a building. Referring now to the designated searching pattern 20 shown in FIG. 2, the user in an attempt at searching for the original image 10 shown in FIG. 1 has arranged a triangle 21 symbolizing the mountain, two ellipses 22 and 23 symbolizing the face and the trunk, respectively, of the person, and a vertically elongating rectangle 24 symbolizing the building, with each figure being fitted in the position where it is most likely to be found.

In FIG. 3, the figures extracted from the original image 10 in FIG. 1 by the program for the image searching method according to the example under consideration are indicated by dashed lines and superposed on the actual objects in the original image 10 that are indicated by solid lines (for clarity, however, the dashed lines are slightly offset from the solid lines). To be specific, kinked line 31 corresponds to the triangular mountain 11 in the original image 10, circles 32 and 33 correspond to the face 12 and trunk 13, respectively, of the same person, and rectangle 34 corresponds to the building 14. A rectangle 35 bridging the windows on the building shown on the right side of FIG. 3 and an ellipse 36 below the building have been erroneously detected by the program.

The original image 10 to treated by the image searching method of the invention is not limited in any particular way as long as it is supplied as image data and may be exemplified by the following: images input or acquired by an image input device, an image acquisition device and the like or images supplied from an image supply source (namely, images recorded on photographic films such as negatives and positives by the conventional type of camera, as well as images such as photographic prints and printed images that are to be read by an image reading device such as a scanner); images taken with a digital still camera or a video camera; images taken with medical diagnostic image recording apparatus such as an X-ray recording apparatus, a CR apparatus, a CT apparatus and an MRI apparatus; and images created by a computer and the like such as a computer graphics image (hereunder referred to as CG image). As will be described later, the following images are also applicable: temporally continuous images successively taken with the conventional camera, the digital still camera and the like (such images are hereunder referred to as dynamically changing images); dynamically changing images taken with the video camera and the like (such images are hereunder referred to as video images); dynamically changing images broadcast on television (which are hereunder referred to as TV images); images having audio information as exemplified by such video images, TV images and CG images; and images accompanied by message information as exemplified by letters, marks, facial images and character images.

The designated searching pattern 20 shown in FIG. 2 may be combinations of different specific figures or combinations of varying sizes of the same specific figure. Aside from direct designation of the searching pattern 20 by the user who either draws specific figures on an image display device with a mouse or from a keyboard or inputs concrete shapes using an image designating device such as a tablet, direct designation may be performed as by designating through keywords such as letters, symbols and marks or by speech input (the input speech is recognized and transformed automatically to concrete shapes that can be designated).

For example, instead of inputting specific figures in FIG. 2, the user surrounds an approximate position on the tablet or the image display device and inputs letters, symbols or marks so that they fit in the surrounded area. If the words "mountain" are input, they are automatically transformed to TRIANGLE SEARCH MODE and processed accordingly. Similarly, if the words "building" and "person" are input, they are transformed to RECTANGLE SEARCH MODE and FACE AND TRUNK SEARCH MODE, respectively. In the case of designation by symbols and marks, not only service bureaus and other sites and centers that have a large store of database for images accompanied by accessory information (and which are commonly referred to as "database organizations") but also users that utilize the database are preferably have the ability to set the symbols and marks that can be input for indirect designation of the searching pattern 20. In this way, the symbols and marks designated by the user can be automatically transformed to specific figures or specific principal subjects, persons and physical objects to be described later on.

The specific figures to be used in the designated searching pattern 20 may be any kind that corresponds to specific information contained in the image and, as set forth above, simple figures such as circles, ellipses, triangles and rectangles are preferred since they are easy to search for; however, these are not the sole examples that can be used in the invention and may be replaced by various other figures including polygons having five or more sides, star shapes, star-shaped characters, irregular shapes, and straight or curved lines and combinations thereof that can be found in the image. It should also be noted that the designated searching pattern 20 need not designate a specific figure itself but may designate at least one attribute of the figure selected from among its center position, size, direction, vertices and color.

The specific information to be used in the invention is not limited to the specific figures described above and, as will be set forth later on, it may be replaced by a specific subject in the image, personal information consisting of the facial image of a specific person in the image and the name of that particular person which accompanies the image, audio information accompanying the image, message information consisting of text data as for letters and handwritten letters such as signatures or image data as for reference images such as marks, recorded images and CG images, and editing data used in the creation of CG images such as CG commands for drawing specific figures, specific colors and specific physical objects.

Figure 4:
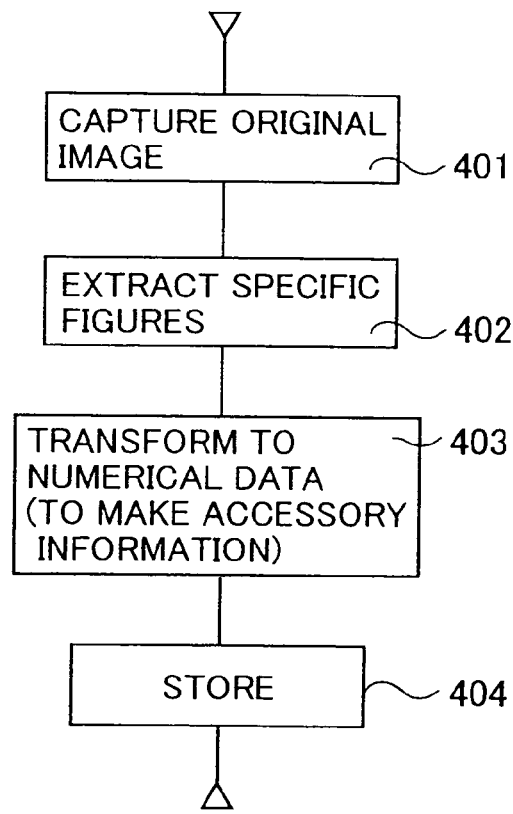
FIG. 4 is a flow diagram showing the outline of steps in a preliminary process of extracting predetermined specific figures from the original image shown in FIG. 1.

On the pages that follow, the outline of steps for extracting predetermined specific figures from the original image 10 shown in FIG. 1 as a preliminary process for the image searching method according to the example under consideration are described with reference to the flow diagram shown in FIG. 4.

In the first step 401, the original image 10 is captured as image data from an image data supply source (not shown). In the next step 402, areas having similar shapes to predetermined specific geometric figures (specific figures for short) are extracted by the aforementioned pattern matching or edge tracing method. Subsequently, in step 403, the extracted areas are transformed to numerical data as related information and their characteristic values to be described below are calculated. In step 404, the calculated characteristic values are stored as accessory information in memory means such as a database (not shown). In steps 402-404, various characteristic values such as the center positions, sizes and directions of the specific figures in the original image 10 are recognized and successively stored in the database as accessory information.

The various characteristic values that can be used as accessory information are exemplified by the following: if the specific figure is a circle, its center position and the diameter as its size are adopted; in the case of an ellipse, its center position and the major and minor axes as its size are adopted; in the case of a triangle, the coordinates of the three vertices are adopted; in the case of a rectangle, its center position and the widths as measured on the X- and Y-axes are adopted. Needless to say, the image searching method of the invention is in no way limited by the kind of characteristic values to be adopted. If the original image 10 is a color image, related information such as the colors of the specific figures may be used as accessory information.

The characteristic values of the specific figures such as their center positions, sizes and directions and related information such as their colors are not the sole examples of the accessory information that can be used in the invention and may be replaced by the following which will be discussed later on: related information such as the position, size, direction and color of a specific subject or person; information about a specific figure, subject or person in a dynamically changing image and the direction of movement of the specific figure, subject or person between frames of the dynamically changing image; audio information per se; message information per se; and editing data per se for creating CG images as exemplified by CG commands.

Table 1 shows an example of the result of extracting three kinds of specific figures from the original image 10 shown in FIG. 1. To be more specific, Table 1 shows that the program for the image searching method according to the example under consideration has extracted three elliptical areas, one triangular area and two rectangular areas from the original image 10. As already mentioned, one of the elliptical areas and one of the rectangular areas have been erroneously detected.

TABLE 1

| | Ellipse (A) | | | Triangle (B) | No. Ellipse (A) coordinate | Rectangle (C) | | |
|---|---|---|---|---|---|---|---|---|
| No i | coordinates of the center | size | direction of major axis | coordinates of the center | of the three points | coordinates of the center | width on X-axis | Width on Y-axis |
| 1 | (a11, a21) | a31 | a41 | (b11, b21) | (b31~b81) | (c11, c21) | c31 | c41 |
| 2 | (a12, a22) | a32 | a42 | — | — | (c12, C22) | c22 | c42 |
| 3 | (a13, a23) | a33 | a43 | — | — | — | — | — |
| 4 | — | — | — | — | — | — | — | — |

Figure 5:
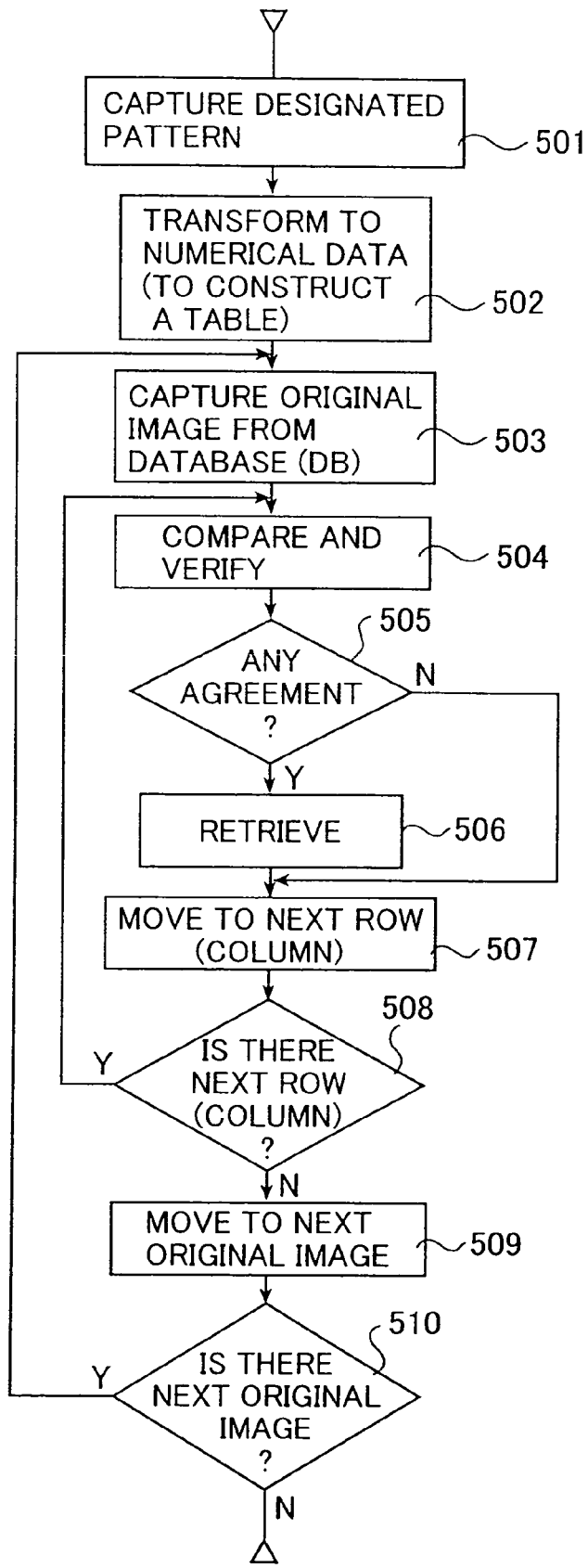
FIG. 5 is a flow diagram showing the sequence of steps in the process of searching through images on the basis of the data stored in memory means.

The flow of steps in the process of searching through images on the basis of the stored data in accordance with the image searching method of the invention is now described with reference to FIG. 5.

First, in step 501, the designated searching pattern 20 is input as a searching condition. In the next step 502, the input pattern 20 is transformed to numerical data (characteristic values) and tabulated in the same manner as typically shown in Table 1. In this step, characteristic values such as the position, size and direction of each specific figure and its color may be directly input. In the next step 503, the original image to be searched through is read from its database (DB). Then, in step 504, the input original image is compared for verification with the designated searching pattern 20 tabulated in step 504.

The verification is performed through the successive rows and columns in the designated searching pattern table. If a plurality of characteristic values in the designated searching pattern are arranged in a single row, the characteristic values in the first designated pattern that are arranged in the respective columns of the first row are compared with the characteristic values appendant as accessory information to the original image read from the database and a check for agreement is made in step 505. If the answer is yes, the characteristic value is retrieved in step 506 as the result of search.

If no agreement is found in step 505, step 506 is bypassed and the process goes to step 507 (MOVE to the next row). In the next step 508, the designated searching pattern table is checked for the presence of the next row; if the answer is yes, the process returns to step 504 and a check for verification is made with respect to the next row by repeating steps 504-508. If no next row is found in step 508, verification of one original image to be searched through ends and the process goes to step 509 (MOVE to the next original image to be searched through). In the next step 510, a check is made to see if the next original image exists. If the answer is yes, the process returns to step 503 and the next original image is searched through. If no next original image is found in step 508, the search through all original images of interest ends.

This is how the searching method of the invention is implemented.

If a plurality of characteristic values in the designated searching pattern are arranged in a column in the table, the above-described verification process is performed through successive columns; if the characteristic values are arranged in blocks of certain rows and columns, the verification is performed block by block.

A word must be said on the sentence reading "If the answer is yes in step 505, the characteristic value is retrieved in step 506 as the result of search". The actual process is not this simple because complete agreement seldom occurs. Preferably, the degree of agreement to be defined below is calculated in step 504 and only in the case where the calculated degree of agreement exceeds a predetermined threshold, the characteristic value is found to "agree" with the accessory information.

It should be noted here that the designated searching pattern 20 that has been input and designated by the user is transformed to tabulated data, as typically shown in Table 2, and stored in a memory unit (not shown). Table 2 shows only data for an ellipse but similar data are constructed for other figures. On the basis of the thus constructed data, the above-described process is performed to search for an original image is search for that fits the designated searching pattern.

TABLE 2

| No j | Ellipse | | |
|---|---|---|---|
| | coordinates of the center | size | direction of the major axis |
| 1 | (ta11, ta21) | ta31 | ta41 |
| 2 | (ta12, ta22) | ta32 | ta42 |

Given below is an example of the mathematical formula for calculating the degree of agreement in the case of an ellipse:

$$D(I, J) = F\{k1 \times ((a1I - ta1J)^2 + (a2I - ta2J)^2) + k2 \times (a3I - ta3J) + k3 \times (a4I - ta4J)\} \quad (Eq.\ 1)$$

where the value of $F\{X\}$ represents a characteristic that increases with decreasing input value X; I represents the number of characteristic values contained in accessory information and ranges from 1 to Imax; J represents the number of searching patterns and ranges from 1 to Jmax; $k_1$-$k_3$ are coefficients.

The score point for J-numbered searching pattern is expressed by:

$$P(J) = \max(D(I,J))$$

The score point for the entire screen is expressed by:

$$Ptotal\ (A{:}ellipse) = \Sigma(P\ (I))$$

$$J = 1 - Jmax.$$

For other figures than ellipse, the same procedure is taken to calculate the degree of agreement in step 504.

Consider the case where the degree of agreement is Ptotal (A), Potal (B) and Ptotal (C) for ellipse, triangle and rectangle, respectively; the degree of agreement in the frame shown in FIG. 2, or Ptotal (ALL), can be calculated by summing up Ptotal (A), Ptotal (B) and Potal (C).

It should be remembered that the specific figures to be used in the invention are by no means limited to the geometric figures described above and many diverse shapes including other polygons, characters such as stars, straight lines, curved lines and combinations thereof may be substituted.

If desired, the results of calculation may be used to display the searched images in a thumbnail layout in the increasing or decreasing order of the degree of agreement.

Two different modes, AND conditional and OR conditional, may be set for the designated searching pattern, as illustrated below.
(1) AND conditional mode: Function F{X} is designed to have such characteristics that it takes a negative value when input X is no more than a specified value. For example, F{X} takes a positive value if there is a designated figure in the designated searching pattern but takes a negative value if there is no such figure. If there is no hit, the overall score point for the degree of agreement decreases.
(2) OR conditional mode: Function F{X} is designed to have such characteristics that it takes either zero or a positive value. For example, F{X} takes a positive value if there is a designated figure in the designated searching pattern but takes zero if there is no such figure. Even if there is no hit, the overall score point for the degree of agreement does not decrease.

In the foregoing example, characteristic values such as position (e.g. center position), size and direction in all designated searching pattern 20 are used as searching conditions to make comparison and verification with the accessory information accompanying the input original image. The present invention is by no means limited to this particular case and only the presence or absence of designated searching patterns may be used as the searching condition or, alternatively, at least one element or item selected from among such characteristic values as position, size, direction and color may be used as the searching condition. If desired, the characteristic values may be used as the searching conditions in combination with the colors (shades) of the designated patterns. In a special case, at least one designated searching pattern may be used as the searching condition.

If the presence or absence of designated searching patterns is to be used as the searching condition or if only a small number of elements, items or searching patterns are designated, less time is taken to complete the searching process and more original images are hit and retrieved, thus increasing the likelihood that the desired original image can be found but, on the other hand, the precision in searching decreases. If more elements, items or searching patterns are designated, the precision in searching improves to increase the chance of hitting and retrieving only the desired original images; on the other hand, it takes a longer time to complete the searching process and if the designated elements, items or searching patterns are not correct enough, the user may end up with hitting no original image. Under these circumstances, the number of elements, items or searching patterns to be designated need be selected as appropriate considering the precision in searching (i.e., the chance of success in hitting the right original image).

In a preferred case of user interface for designation and searching purposes, the user may have an option to designate a suitable mode from the following three: 1) a check is made for only the presence or absence of specific information such as specific figures; 2) in addition to this check, characteristic values of specific figures such as their positions, sizes and directions, as well as their colors are also used; and 3) as a means of associating various items and elements such as the characteristic values and colors of specific figures, they are used either independently or in combination. To give an example, coefficients $k_1$ and $k_2$ in Eq. 1 may be adjusted to zero and excluded from the calculation of the degree of agreement.

The image searching method according to the example just described above offers the advantage that an image complying with the given instruction can be searched for by a simple way of giving instructions such as drawing a rough sketch of figures on a tablet, inputting the names or symbols of figures from a keyboard or inputting these instructions by speech. In the present invention, figures or their names (in language) that have been entered by simple ways of giving instructions or designation by symbol or speech are transformed automatically to specific figures, further transformed to numerical data consisting of the required characteristic values and changed in color shades and the like.

We next describe another example of the first embodiment of the invention. In the first example, specific figures are used as specific information and the positions, sizes, directions, colors, etc. of the specific figures to be searched through are used as accessory information. In the second example, a specific principal subject (hereunder referred to as a specific subject and a human individual is given as an example in the following description) is used as specific information and its position, size, direction, color, etc. are used as accessory information in the searching process.

Figure 6:
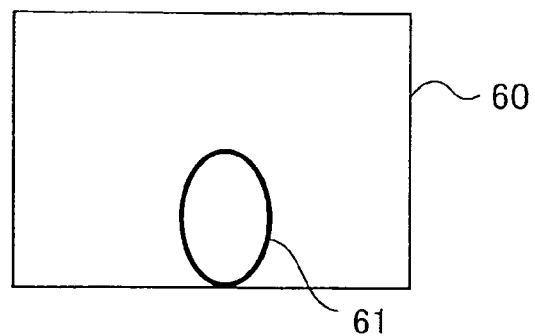
FIG. 6 shows a subject designated by an image searching method according to another example of the invention.

FIG. 6 shows a specific subject 60 that is designated to start the searching process. In the example under consideration, the subject is set as a person and its presence or absence or at least one element selected from among its position, size, direction and color is specified using a simple figure, say, an ellipse 61.

Figure 7:
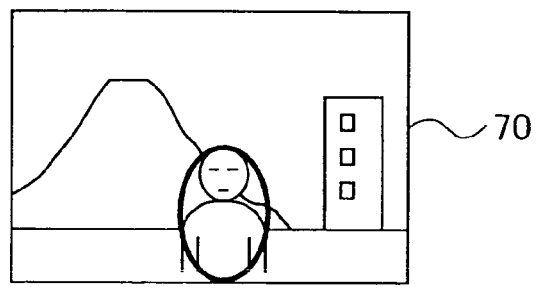
FIG. 7 shows an example of the result of searching for the subject in response to the designated shape in FIG. 6.

FIG. 7 shows the result of searching that corresponds to the designation of the person. In the case under consideration, searching is done on the basis of only the position and the size of the person to hit the desired image 70.

The image searching method of the second example offers the advantage that if a person is to be searched for, an image that complies with the given instruction can be searched for by a simple way of giving instructions such as drawing on the tablet a rough sketch of the person per se or at least one element selected from among his or her position, size and direction or inputting from the keyboard the presence or absence of the person or at least one element selected from among his or her position, size and direction.

Besides the position and size of the person, information expressing his or her clothes by color may be added; if the color shade of the trunk of the person is checked in the searching process, the efficiency of search may potentially improve by large extent. If desired, the characteristics of more than one person may be combined.

In certain fields of application, specific figures or subjects may be substantially fixed in position. In that case, their sizes either alone or in combination with their directions, optionally together with their colors, may be recorded as accessory information.

If specific figures or subjects are substantially fixed in size, their positions either alone or in combination with their directions, optionally together with their colors, may be recorded as accessory information.

We next describe yet another example of the present invention. In the previous examples, static images are searched through and the initial positions of specific figures or specific subjects (persons) and the directions of their movements are used as accessory information and designated as a key in the searching process. In the third example, a person 81 is set as the specific subject and the direction of its movement (vector) 82 is designated by an arrow.

Figure 8:
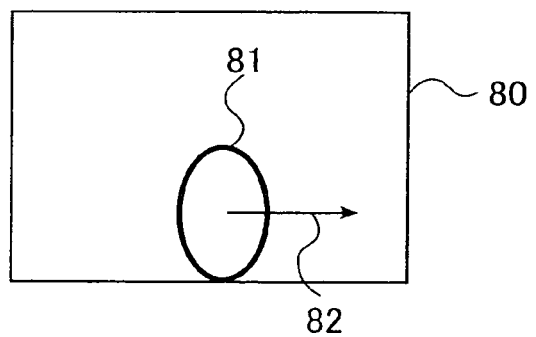
FIG. 8 shows a subject designated when dynamically changing images are searched through by an image searching method according to still another example of the invention.

FIG. 8 shows a specific subject designated to search through dynamically changing images.

Figure 9:
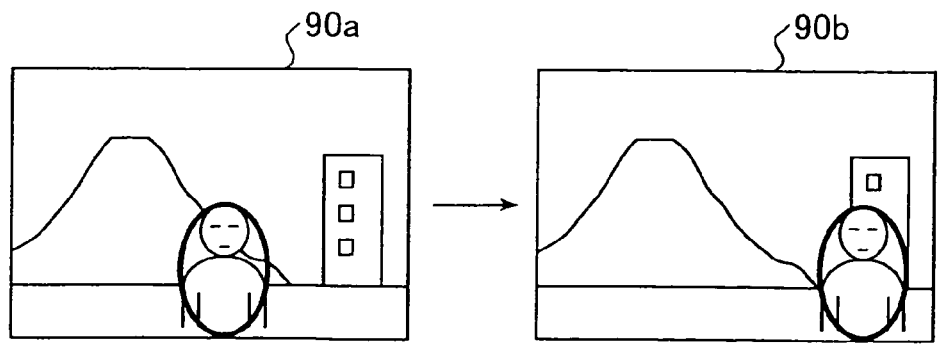
FIG. 9 shows an example of the result of searching for dynamically changing images in response to the designated shape in FIG. 8.

FIG. 9 shows the result of searching that corresponds to the designation of the person. In the case under consideration, searching is done on the basis of only the initial position and size of the person to hit the desired dynamically changing images 90*a* and 90*b* have been searched for.

To register accessory information in the third example, a designated figure (specific figure) or a designated subject (specific subject) that have been extracted within a frame of dynamically changing image is traced for the movement it has made through a specified number of frames and the obtained vector information is stored as part of the accessory information. For searching purposes, matching with the accessory information is performed on the basis of the designated figure and the vector for its movement (representing either its size or direction or both).

In another method, accessory information can be constructed frame by frame and search is made in the following manner. If a designated figure (specific figure) or a designated subject has been detected frame by frame, matching with the accessory information is done to make a check of whether the same designated figure is found in the corresponding position (which can be determined from the designated motion vector) in a frame after the lapse of a specified time from the current frame (or in an intermediate frame).

In the image searching method of the third example, the program decodes the designated information for the input scene into simple shapes and their movements and the degree of agreement with the accessory information for each of the dynamically changing images in the database is calculated. The results of calculation are output (in a thumbnail layout) by indicating the frames of relevant dynamically changing images in the order of score points.

The image searching method of the third example offers the advantage that if a person in a dynamically changing image is to be searched for, a dynamically changing image that complies with the given instruction can be searched for by a simple way of giving instructions such as roughly showing its initial position and the direction of its movement on the tablet or inputting them from the keyboard or by speech. As a result, when editing videos, images can be easily searched through by rough scene description.

A further example of the invention is described below. In the previous examples, images that do not contain audio information are searched through but in the fourth example, images such as dynamically changing images that contain audio information are searched through and outlines of the audio information are contained as part of the accessory information; for searching purposes, such outlines of the audio information are designated.

Take, for example, a dynamically changing image that contains a human individual as a subject. Audio information is picked up in addition to motion information and its contents are stored in the database by speech conversion. For searching purposes, a set of keywords consisting of SUBJECT: PERSON and AUDIO INFORMATION: SCHOOL may be designated to search through scenes in which a person is found and which are related to the word "school". The images to be searched through need not be dynamically changing images but static images accompanied by audio information may be substituted.

The image searching method of the fourth example offers the advantage that if the images to be searched through have audio information, it may be used to search for an image that complies with the given instruction. Since search can be made not only from the movement of the subject but also from the contents of his or her speech, there are great benefits to the case of editing videos. Needless to say, audio information is not the only information that can be used in the fourth example and various kinds of information about specific figures or a specific principal subject (person) may be additionally designated.

We describe a still further example of the invention. In this fifth example, a specific person in the image is identified by a person identifying treatment which comprises the steps of preliminarily registering the facial images of specific persons and their names as accessory information and searching for the desired image by designating one of the registered persons with reference to his or her facial image and name.

Specifically, the customer preliminarily registers information about N persons in the form of the combination of name and facial image. To identify a specific person in the image by a person identifying treatment, there can be applied known techniques such as the ones described in Kosugi et al., "Searching Through Similar Facial Images Using Mosaic Features of Varying Densities", Journal of the Institute of Electronics, Information and Communication Engineers, vol. J80-D-11 No. 8, pp. 2218-2224 and Soma et al., "Verification of Facial Images Acquired by Extremely Different Processes", Journal of the Institute of Electronics, Information and Communication Engineers, vol. J80-D-11 No. 8, pp. 2225-2231.

Images submitted to a service bureau may be subjected to the above treatment to extract the face and identify the person of interest so as to construct accessory information. To be specific, accessory information telling who are in each frame is added to the image data and stored. Needless to say, information about the position and size of the person may be included as part of the accessory information. In the case where the customer asking for image search designated the name of a person, an image frame showing the right person is retrieved on the basis of the accessory information.

In the image searching method of the fifth example, the facial image of the person to be searched for and his or her name are keyed to each other when they are transformed to accessory information and an image that complies with the given instruction can be searched for by making use of that information. For example, a photo full of memory can be easily searched for by using the name of a family member as a keyword. Needless to say, not only static images but also dynamically changing images can be searched through by the method of the fifth example.

When searching through images having audio information, various kinds of audio information may be combined with each other.

If the service bureau is connected to the personal computer of a customer by communication lines, the above-described treatment can be performed on-line at a faster speed.

The following is a yet another example of the invention. In the previous examples, it is chiefly the recorded images that are to be searched through. In the sixth example, computer graphics (CG) images typically created with a personal computer are searched through and a scene is designated by simple figures, approximate colors or a rough sketch of specific figures and search is made using CG image creating and editing data.

In the sixth example, editing data relevant to the creation of CG images is used as specific information; at the same time, it is used as accessory information to the CG images and stored in the database. In the database organization, the CG images and the editing data are stored as a set. The editing data are preferably CG commands that represent the simple figures, approximate colors and specific objects such as humans, animals, automobiles and buildings in the CG images and which were entered to create those figures, colors and objects.

When searching through CG images in the example under consideration, the user (customer) designates a scene by simple figures, approximate colors or specific objects such as humans, animals, automobiles and buildings. The designation is preferably done either manually or by means of drawing software, CG software and the like.

In the database organization, a database processor is used to transform the scene designating data from the user into CG commands. In this step, the shapes of the figures the user adopted to designate the scene, characteristic values such as position, size and direction, colors, etc. are preferably classified into predetermined patterns.

In the next step, the degree of agreement or similarity between the transformed CG commands and the CG editing data in the database that accompanies the CG images as accessory information is calculated and matching with the accessory information is performed. The results of calculation may be output (in a thumbnail layout) by indicating the frames of relevant CG images in the order of score points.

The image searching method of the sixth example offers the advantage that if the data for the creation and editing of the CG images to be searched through is used as accessory information, the volume of calculations that must be made in the process of searching through CG images can be sufficiently reduced to ensure rapid and precise searching for a CG image that complies with the user instruction. Needless to say, the CG images to be searched through may be static or dynamically changing. If dynamically changing CG images are to be searched through, specific figures or objects and their motion vectors (representing either their size or direction or both) are preferably designated as described above. When searching through images having audio information, various kinds of audio information may be combined with each other.

We next describe a still further example of the invention. In this seventh example, images having message information are searched through and the message information that accompanies the images for searching purposes are checked to perform the intended search. As in the already-described case of searching through images having audio information, the message information accompanying the image is used as specific information and, at the same time, it is used as accessory information to the images and stored in the database.

The accessory information to the images is preferably the text data synthesized with the images as message information or image data such as marks, recorded images and CG images. As in the above-described case of audio information, text data that accompany the images rather than being contained in them or image data, for example, text data recorded (synthesized) on the back side of printed images or in the white margins of printed images if they have such white margins or image data may be substituted.

Exemplary text data are printed character data as output from a word processor and handwritten character data such as signatures; if desired, character data obtained by extracting letters from images may be substituted.

To search through images in the example under consideration, the user (customer) designates the message information by letters per se, their contents, the shape of handwriting (as in the case of signatures) or selects one of the reference images registered as message information; after the designation, matching is performed.

Consider, for example, the mode of searching through letters per se; as in the already-described case of designating the characteristic values of specific shapes, their colors, etc. to make search using such specific figures, the presence or absence of letters or at least one element selected from among the positions of the letters, their sizes, directions, colors, etc. is designated and matching is performed by calculating the degree of agreement and selecting the image that satisfies the requirement for agreement. If the contents of letters are to be designated in the LETTER SEARCH mode, the contents of letters such as designated kanji (Chinese characters) are interpreted and matching follows. In the case of handwritten letters such as signatures, the shape of the handwriting may be designated for matching purposes.

If search is to be performed using reference images, the user designates the area of a reference image from a plurality of reference images such as marks, recorded images and CG images that have been registered as message information, or selects one of the prepared pictorial patterns or otherwise selects one or more reference images; after this designation, image matching is performed.

If desired, the results of calculation of the degree of agreement in the matching process may be output (in a thumbnail layout) by indicating the frames of relevant images in the order of score points.

The image searching method of the seventh example offers the advantage that if text data such as letters or reference image data are used as message information that accompanies the images to be searched through, an image that complies with the given instruction can be searched for by a simple way of designation such as designating the characteristic values of letters per se, their colors or contents and the shape of handwriting or by another simple way of designation such as designating a reference image area from a plurality of preliminarily registered reference images or selecting one of the prepared pictorial patterns.

If the user wants to display an image as the result of searching, the area that meets the designated searching condition(s), excepting motionless parts such as the background, may be displayed in preference to other areas. In another effective way, the area complying with the designated searching condition(s) may be displayed as enhanced over the other areas after it has been subjected to special image processing such as luminance enhancement or blinking.

By adopting this display method, the data transfer volume required to transfer the hit images to a monitor or the like can be significantly reduced, so the response speed of display is sufficiently increased to provide higher operating efficiency. In addition, the desired image in the display screen becomes easier to look at, again providing higher operating efficiency.

When the desired image is to be displayed, it is preferred to check the performance of the display device and let it display the image after the image data has been processed to meet the specific performance of the display device. According to another effective approach, the areas that have been searched through are managed on the database area by area and the priority of reference in search mode or the image resolution for data storage is set in accordance with access frequency.

This method may be implemented as follows: when the customer accesses the database center (organization) from his or her mobile terminal, information about the display performance of the mobile terminal is transferred with the ID and the data being transferred from the center is subjected to various image data processing steps such as image compression, binarization, conversion to line art and trimming (cutting only the principal subject).

By thusly performing efficient processing for image display, the data traffic volume can be reduced, the time to image display at the mobile terminal is shortened and the displayed image becomes easier to look at.

To manage the image data furnished with various kinds of accessory information, it is preferred to divide the image into a plurality of areas for the respective subjects and register the individual areas with labels attached. If only the labeled areas are sliced and stored in file format, there are great benefits to reduction of data volume and faster search speed. Another applicable method is by storing only the images in the labeled areas at high resolution while storing the other areas after image compression.

Various kinds of accessory information may accompany the areas of the image and they include the name of image file, its position (center and contour pixels), attributes such as color, and cumulative number of accesses/number of hits. If the memory hierarchy in the storage means is controlled in accordance with access frequency using such accessory information, the search speed can be further increased. Data having high frequency of use becomes much easier to use if it is saved individually.

Having described the image searching method according to the first embodiment of the invention, we now explain the image processing method according to the third embodiment of the invention which applies said image searching method. According to the first approach, at the time of first printing (so-called "simultaneous printing") or a previous reprinting at the service bureau (the term "previous printing" is hereunder used to represent the two printing events), specific information such as specific figures or a subject in the printed image is extracted and the extracted specific information and related information (characteristic values and colors) are used as accessory information and stored in memory means such as the database together with the image data for printing and the parameters for image processing.

If it receives a request for reprinting a film containing the image or making a later reprint of the same (the term "later printing" is used to represent the two printing events), the service bureau extracts specific information such as specific figures or a subject from the image frame designated by the customer and performs later printing under the image processing conditions (processing parameters) employed to perform the previous printing of the image having a high degree of agreement (in excess of a predetermined threshold) with the previously stored accessory information.

According to this image processing method, the image processing conditions adopted in the previous printing can be searched from the image submitted to the service bureau at the time of later printing and prints are produced that have high enough fidelity to satisfy the customer. The above-described processing is not only applicable to photographic films; it is equally applicable to smart media such as DSC (digital still camera) or other captured image recording media having printing image data recorded thereon, and image recording media such as MOs and photo CDs.

Now consider the case where the customer placing an order for reprinting has submitted to the service bureau not the photographic film or the captured image data on captured image recording medium but the photographic print made at the time of simultaneous printing. The service bureau reads the print with a scanner, executes the extraction of specific information such as specific figures for image searching, uses the extracted specific information and related information as the conditions for searching through the image data in the database that have been read from the photographic film recorded at the time of simultaneous printing, calculates the degree of similarity (performs matching), picks up the relevant frame, and performs printing. In the printing step, the image data corresponding to the relevant frame and which was input at the time of simultaneous printing and the associated processing parameters may be retrieved for printing operations.

The second approach is applied to ensure that there will be no variations in printing a single film strip (so-called photographic films of a single case), or a single captured image recording medium, or one or more photographic films or captured image recording media for which an order was placed by the user (customer) at a time (so-called single order). The rationale of this approach derives from the fact that if photographic films or captured image recording media of a single case or a single order (the term "a single order" is used to represent the two kinds) have compositions characterized by similarity in specific information such as specific figures or subjects (the term "composition" means the layout of different figures, their sizes, directions and colors), image processing is preferably adjusted to ensure that individual frames within a single order have uniformity in the finishing color and density.

According to the second approach, similar images are differentiated on the basis of their compositions, so its performance is less sensitive to the effects of color and density; as a result, there is no possibility that prints having extremely different colors and densities are produced from photographic films or captured image recording media of a single order and no customer will leave the service bureau dissatisfied.

Described above are the fundamental features of the image searching method according to the first embodiment of the invention and the image processing method according to the third embodiment.

We now describe in detail the image searching method according to the second embodiment of the invention by referring to FIGS. 10-15B.

Figure 10:
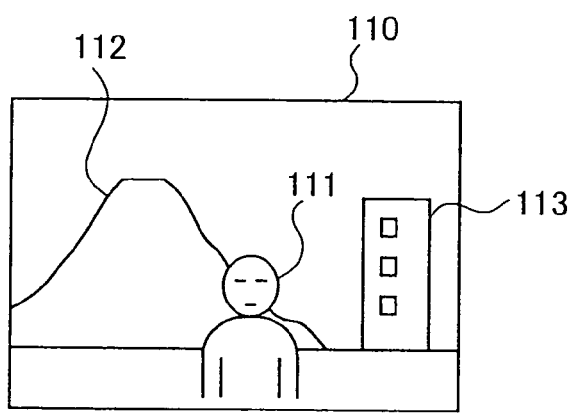
FIG. 10 shows an original image 10 on film that was taken with a GPS incorporating camera and which is to be searched through by an image searching method according to yet another example of the invention.
Figure 11:
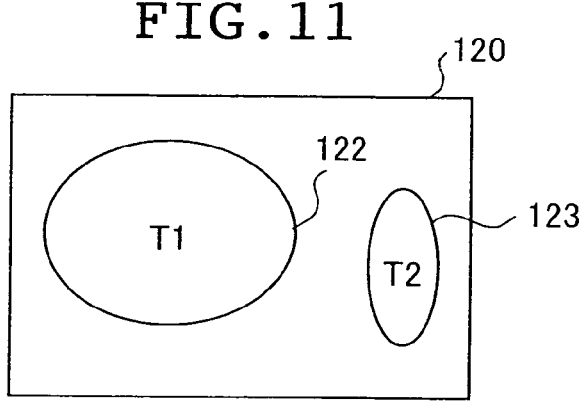
FIG. 11 shows a designated searching pattern 20 entered by the user to search through the original image shown in FIG. 10.

FIGS. 10 and 11 are diagrams for illustrating an image searching method according to an example of the second embodiment of the invention. To be specific, FIG. 10 shows an original image 110 on a photographic film that was taken with a GPS incorporating camera. The original image 110 is captured with an image reading device such as a scanner and its image data is stored in memory means such as the database. FIG. 11 shows a designated searching pattern 120 which the user in an attempt to search through the original image 110 has input with a mouse or the like so that it is displayed on the screen of a terminal device or an image display device.

Referring to the original image 110 shown in FIG. 10, numeral 111 indicates a human being as a principal subject, 112 indicates a mountain (hereunder called "Mt. X" for convenience sake) which is a subject effective to specify the shooting place (the place where the original image was taken) or the shooting position (the position in which the original image was taken), and 113 indicates a famous building (hereunder called "Z Bldg.") which is also a subject effective to specify the shooting place or position.

The designated searching pattern 120 shown in FIG. 11 was input by the user to express his or her desire of "searching for a scene showing a mountain called so-and-so around area T1 and also showing a building called so-and-so around area T2". Numeral 122 is an indication of the position where the mountain is and 123 is an indication of the position where the building is.

As preliminary steps for the image searching method according to the example under consideration, the position and name of a subject whose position in the original image 110 shown in FIG. 10 can be specified are specified and the outline of an example of these steps is described below with reference to the flow diagram in FIG. 12.

Figure 12:
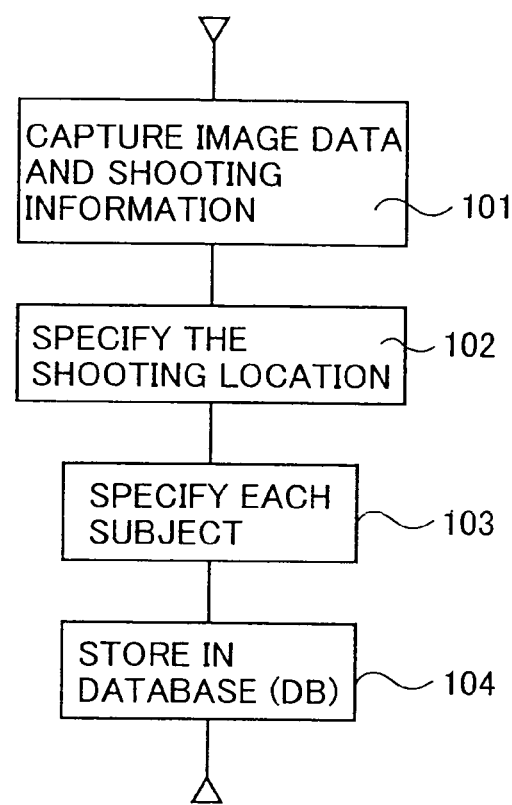
FIG. 12 is a flow diagram showing the outline of preliminary steps for an image searching method according to another example of the invention that are performed to specify the positions and names of subjects whose positions in the original image 10 can be specified.
Figure 13:
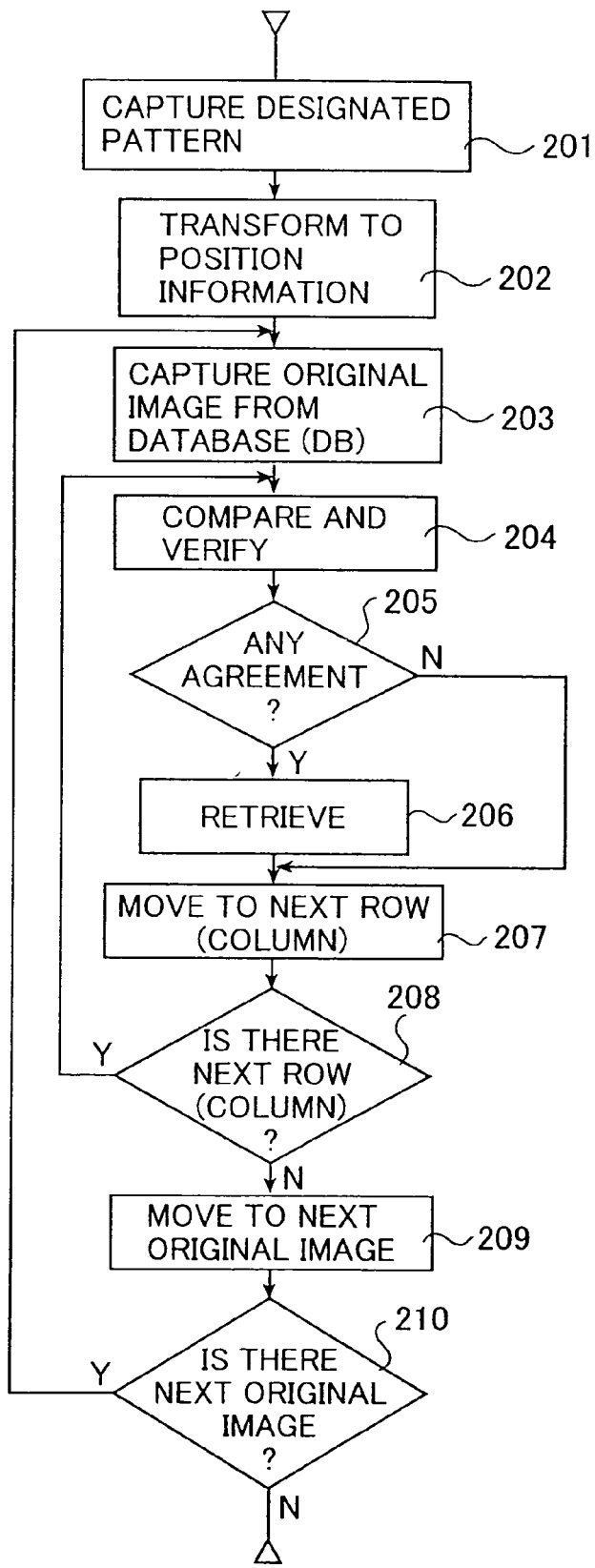
FIG. 13 is a flow diagram showing the sequence of steps in the process of searching through images on the basis of the data stored in memory means by an image searching method according to a further example of the invention.

As FIG. 12 shows, when the image is captured, typically with a scanner, in step 101, the accompanying data, i.e., the aforementioned GPS information about the shooting time, as well as the camera direction and magnification rate relevant to the shooting time are also captured. In the next step 102, the captured GPS information is superposed on already available map information, whereupon the shooting location on the map is specified.

In the nest step 103, the camera direction and magnification rate relevant to the shooting time are superposed on the map information, whereupon the subject in the image is specified so that its position, name (e.g. place name), size on the screen and like items are specified. In this process, a simulated image may be created on the basis of camera direction and magnification rate in the relevant position on the map and subjected to pattern matching with the recorded image so as to specify the subject. In the last step 104, the positions, names (e.g. place name), sizes, etc. of the specified subjects are keyed to the image data and stored successively in the database.

Table 3 shows an example of accessory information that has been created on the basis of shooting position information added to the original image and which is to be further added to the image data for the original image.

As shown, the subjects such as Mt. X and Z Bldg. whose positions are already known from the GPS information about the shooting time and camera direction and magnification rate relevant to the shooting time are listed together with their positions on the screen (or addresses on the image data stored in the database), shapes, sizes, positions on the map and names (e.g. place name).

In the illustrated case, the subjects in the original image are specified and their positions, names (e.g. place name) and sizes are used as added information. This is not the sole case of the invention and the place where the original image was taken (the place represented by the original image) may be specified whereas the position, name (e.g. place name), etc. of the specified shooting place are used as accessory information. Alternatively, information about the specified subjects and shooting place may both be used as added information. In this case, the shooting place may be specified as a single point on the map or it may be roughly specified as a local area.

The shooting date, information about the shooting position (latitude, longitude and place name) and other camera information may also be registered in the database as accessory information to the recorded original image.

TABLE 3

| No i | Screen information | | | Map information latitude, longitude | Subject name |
|---|---|---|---|---|---|
| | coordinates of the center | size | vertical position | | |
| 1 | (a11, a21) | A31 | A41 | (b11, b21) | Mt. X |
| 2 | (a12, a22) | A32 | A42 | . . . | Lake Y |
| 3 | (a13, a23) | A33 | A43 | . . . | Z Bldg. |
| 4 | (a14, a24) | A34 | A44 | . . . | — |

In the example under consideration, the step of listing the above-mentioned accessory information is performed automatically, so the user can save the trouble of inputting the names of subjects as searching data when registering the image data in the database.

The user starts the image searching process by inputting various items as searching information, or searching reference data, and they include the position and name of the place where the original image was taken or the position information (latitude and longitude) about the subjects in the original image on the screen and their names (e.g. place name). Such reference data may be input by manipulation of a mouse or the like on the display screen of a terminal device as in the case of designating the searching pattern 120 shown in FIG. 11. Indirect position designation can be made by specifying the names of mountain and building.

Image searching is then performed on the basis of the thusly stored data. An example of the image searching process in the case under discussion is described below with reference to FIG. 13.

The process starts with step 201, where a designated searching pattern of the type shown in FIG. 11 is captured as a searching condition. In the next step 202, the captured pattern is superposed on map information so that it is transformed to user designated searching information, or position information about the subjects of interest. In this instance, the position information for each subject as transformed from the designated searching pattern is preferably tabulated. These steps may be skipped if the user has directly input at least one item selected from among the position information, name (e.g. place name) and size of the subject or shooting place.

In the next step 203, the original image to be searched through is captured from the database (DB). Subsequently, in step 204, the captured image is compared for verification with the position information in a table format of the designated searching pattern 20. As in the case of comparison for verification with the designated searching table used in the already described first embodiment of the invention, verification is performed through the successive rows and columns in the position information table. For instance, in step 204, the position information for each subject given in a row or column in the table is compared for verification with the position information appending as accessory information to the original image read from the database and a check for agreement is made in step 205. If the answer is yes, the position information is retrieved in step 206 as the result of search.

If no agreement is found in step 205, step 206 is bypassed and the process goes to step 207 (MOVE to the next row). In the next step 208, the position information table is checked for the presence of the next row or column; if the answer is yes, the process returns to step 204 and a check for verification is made with respect to the next row or column by repeating steps 204-208. If no next row or column is found in step 208, verification of one original image to be searched through ends and the process goes to step 209 (MOVE to the next original image to be searched through). In the next step 210, a check is made to see if the next original image exists. If the answer is yes, the process returns to step 203 and the next original image is searched through. If no next original image is found in step 208, the search through all original images of interest ends.

This is how the searching method of the second embodiment of the invention is implemented.

A word must be said on the sentence reading "If the answer is yes in step 205, the characteristic value is retrieved in step 206 as the result of search ". The actual process is not this simple because complete agreement seldom occurs. Preferably, the degree of agreement to be defined below is calculated and only in the case where the calculated degree of agreement exceeds a predetermined threshold, the characteristic value is found to "agree" with the accessory information.

An example of the method of calculating the degree of agreement is by using the "coordinates of the center", "size" and the "vertical direction" listed as accessory information in Table 3, calculating the degree of agreement (or similarity) for a plurality of candidates for subjects in the database of the original images and outputting the searched images in the decreasing order of score points for the degree of agreement.

According to the image searching method of the example under consideration, an image that complies with the given instruction can be searched for on the basis of the designated searching pattern 120 the user has input, typically with a mouse, on the screen of a terminal device or a like image display device or on the basis of the position information (latitude and longitude) about the subjects in the screen, their names (e.g. place name) and the like that have been input as searching information from a keyboard.

We next describe another example of the second embodiment of the invention. In the previous example, the position and name (e.g. place name) of the shooting position or subject that have been created from the original image and the associated shooting information (position information) and map information are used as accessory information. In the following description of the example under consideration, scenes are differentiated or verified using the image's depth information (which represents the depth in the image or the distance from the camera) as accessory information.

In this example, depth information for various subjects in the image can be derived using shooting position information and map information but it should be understood that the example can also be applied to the case where no such shooting position information or map information is used. In this alternative case, the depth information for various subjects in the image may be derived from multi-stage focused images or stereoscopic images that are within well-known camera technology.

Figure 14:
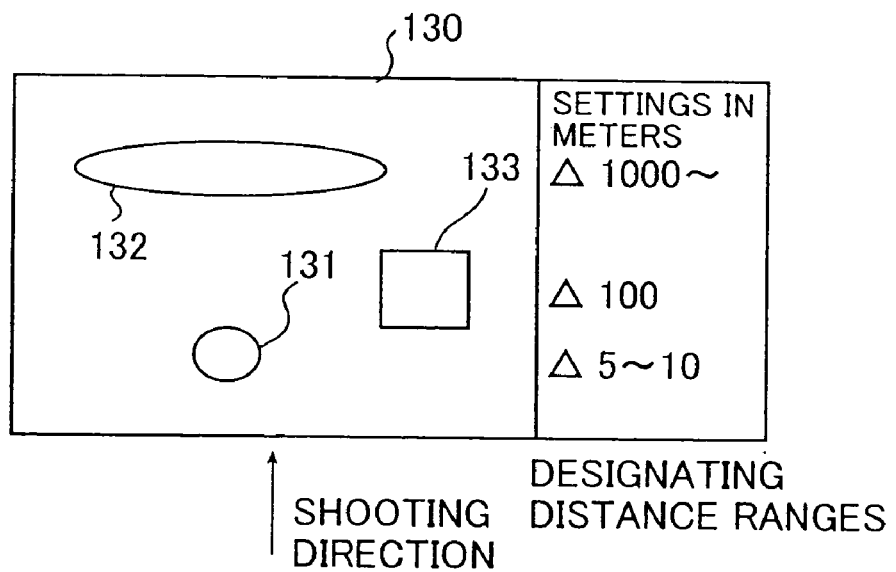
FIG. 14 is an exemplary designated searching pattern containing depth information for use in still another example of the invention.

FIG. 14 shows an example of designated searching pattern 130 which contains depth information. In the case shown in FIG. 14, a circle 131 corresponds to a person, an area far back above corresponds to a mountain (and indicated by a horizontally elongated ellipse 132) and a rectangle 133 on the right corresponds to a building.

Stated more specifically, FIG. 14 shows a scene in which the person 131 stands at a distance of about 5-10 m, the building 133 is located on the right side far about 100 mm back, and the mountain 132 is farther backward of the person by a distance of about 1000 m. If desired, the designation of the positions of the subjects in the screen shown in FIG. 11 may be combined with the layout shown in FIG. 14 which consists of the shapes of the subjects.

By means of the layout shown in FIG. 14, the image to be searched for is designated by the user who expresses the depth of the scene for each of the roughly divided areas. Calculation is then made for the degree of agreement between the contents of the designated image and a plurality of candidates for the subjects in the database of the original image and the searched images are output in the decreasing order of score points. If desired, subjects shown as patterns may be arranged in a virtual map space of the type constructed by combining FIGS. 11 and 14 so that an outline of the depth or map is designated.

According to the image searching method of the example just described above, the user adds a 2D layout of subjects to the input searching pattern 120 and this offers the advantage of enabling much easier searching for an image that complies with the given instruction.

The image searching method of this example is also applicable to dynamically changing images. In this case, information about the motion of dynamically changing images between frames can be utilized.

We next describe a further example of the second embodiment of the invention. The following description of this third example concerns the case which employs a layout showing the relative positions of subjects. The layout may be the one shown in FIG. 14 but any other layout can be used as long as it shows the horizontal positions of subjects such as a mountain and a building relative to a person which is the principal subject.

Position information that can be used here may be the aforementioned GPS information or the result of position determination by PHS (standing for the personal handyphone system which, in the state of the art, is much inferior to GPS in terms of precision) or more rough position designating information (such as the indication of "xx-chome, yy-machi, zz-shi).

Thereafter, matching is performed by verifying the layout on the map data against the layout used in designation and the degree of agreement is calculated for each candidate of subjects. If there is no information about camera direction, it can be simulated by rotating the camera direction through an angle of 360 degrees at predetermined intervals. If positional precision is low, simulation can be made by parallel shifts within a predetermined range.

According to the example under consideration, simple instructions suffice to search for images using topography and other information, thus providing efficiency for the search.

Figure 15A:
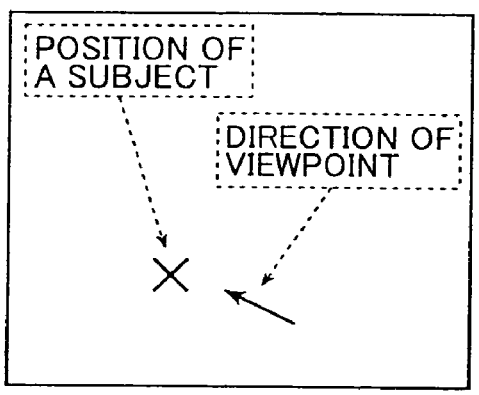
FIG. 15A is a diagram showing the relationship between position information and the direction of viewpoint for the case where the subject of interest can be identified.
Figure 15B:
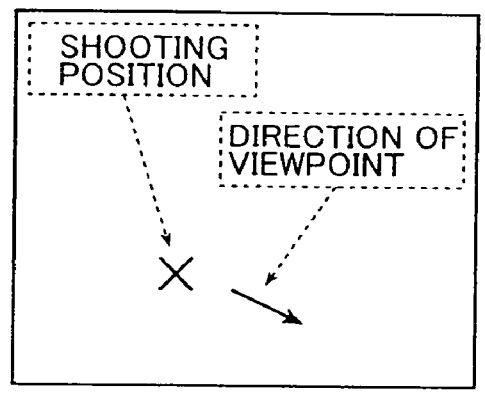
FIG. 15B is a diagram showing the relationship between position information and the direction of viewpoint for the case where the shooting place can be identified but the identity of the subject of interest cannot be identified.

When the above-described image search is performed by the prior art technology, position information and the direction of viewpoint are often provided in the manner shown in FIG. 15B, where the position information is the camera position (GPS information) and the direction of viewpoint is the shooting direction (camera information). If a format like the one shown in FIG. 15A is obtained, namely, if information is obtained about the position of a subject and the shooting direction, this can be used to perform the following operation.

Since the user already knows what was taken by the camera, the recorded image of the subject is retrieved from the available image database and a computer graphics (CG) image is created on the basis of the retrieved image; the CG image is compared with the actually recorded image and after the necessary adjustments such as position adjustment and size adjustment are made, the difference between the two images is taken and stored as data, optionally after compression.

The CG image is not the sole example of the simulated image and other images may be employed, such as a real image that was taken previously and which is believed to be the best approximation in the light of position information and camera shooting information, and the combination of such real image with the CG image. Whichever kind of image is used, the volume of data to be stored can be reduced.

This is the basic features of the image searching method according to the second embodiment of the invention.

The image searching methods according to the first and second embodiments of the invention and the image processing method according to the third embodiment of the invention can be implemented by means of an image searching apparatus 302 and a print system 300 using this apparatus 302, respectively. These are shown in FIG. 16.

Figure 16:
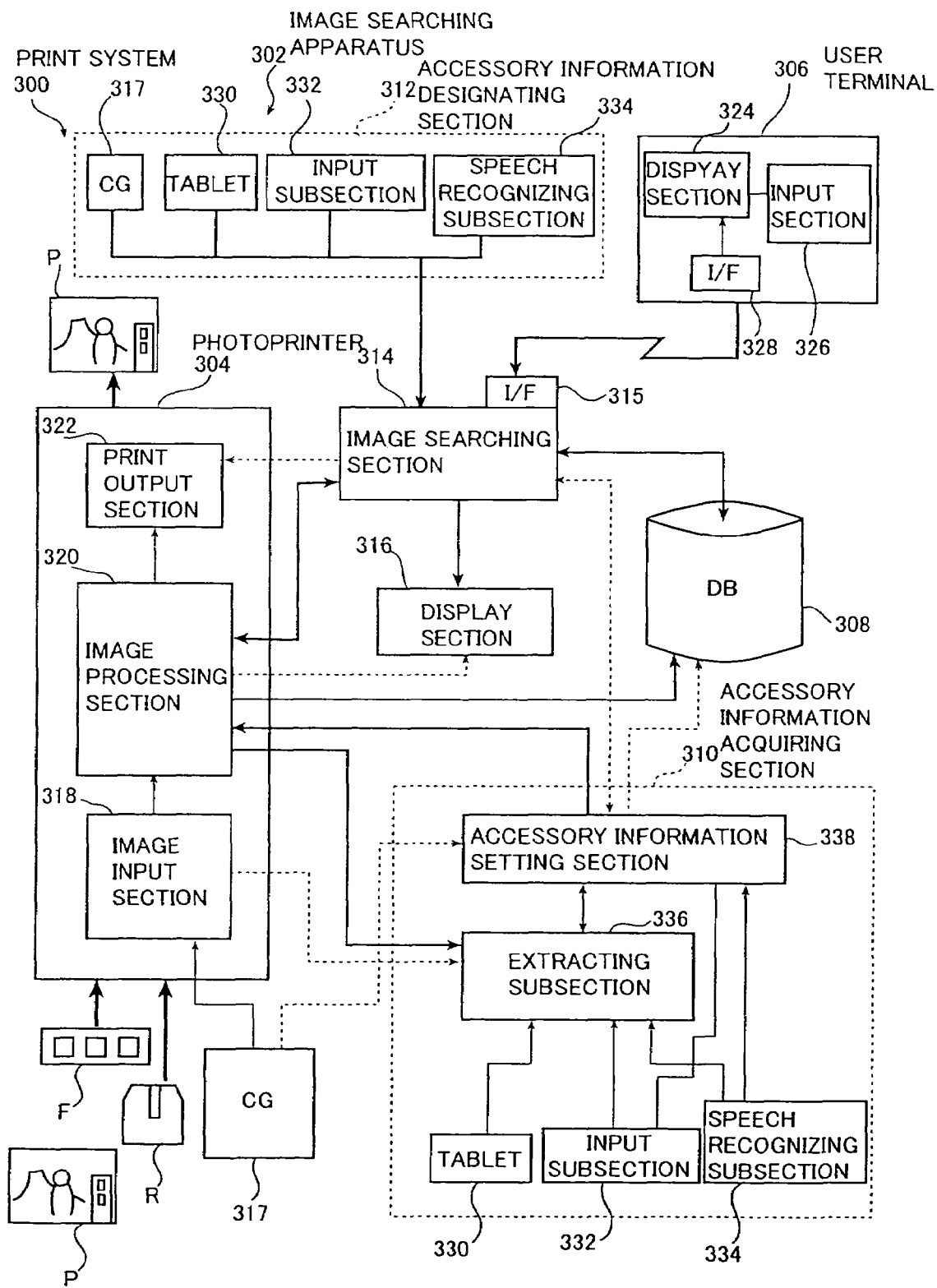
FIG. 16 is a block diagram showing an exemplary print system that implements the image processing method of the invention and that employs an image searching apparatus for implementing the image searching method of the invention.

The print system 300 shown in FIG. 16 comprises the image searching apparatus (which is hereunder simply referred to as searching apparatus) 302 for implementing the image searching method of the invention as mentioned above;

a photoprinter 304 that is connected to the searching apparatus 302 and that implements the image processing method of the invention in corporation with the searching apparatus 302; and a user terminal 306 that is connected on-line to the searching apparatus 302 by a communication network such as Internet and that can implement the image searching method and image processing method of the invention and also make a request for print output.

First of all, the image searching apparatus 302 comprises an image database (which is hereunder simply referred to as database or DB) 308; an accessory information acquiring section (which is hereunder simply referred to as acquiring section) 310; an accessory information designating section (which is hereunder simply referred to as designating section) 312; an image searching section (which is hereunder simply referred to as searching section) 314; and a display section 316. The data base 308 stores not only the image data of an image of interest, but also the specific information per se or the related information that is found in or accompanies the image as the accessory information of the image data. The acquiring section 310 acquires the specific information per se or the related information as the accessory data for storing in the database 308. The designating section 312 designates at least a portion of the accessory information as the searching condition. The searching section 314 searches the database 308 based on the searching condition designated by the designating section 312 and determines the degree of agreement of the accessory condition that is appendant to the selected image data with at least a portion of the accessory information used as the searching condition thereby reading an image having a degree of agreement above a predetermined value. The display section 316 displays the result of the search made by the searching section 314 and the read image.

The photoprinter 304 comprises an image input section 318, an image processing section 320 and a print output section 322. The image input section 318 reads the image data of an image recorded on a film F such as a negative or reversal film or the image data of an image taken with a digital camera and stored in an image data recording medium R, or receives the image data from an image data supply source such as a CG image creating device 317. The image processing section 320 analyses the image data received from the image input section 318 to set the image processing conditions for use in processing image data with a view to creating a print of high quality and subjects the image data received from the image input section 318 or the searching apparatus 302 to image processing according to the image processing conditions previously set or received from the searching apparatus 302. The print output section 322 exposes a photosensitive material or another recording material using the image data processed in the image processing section 320 to record an image (or latent image), which is then developed to be output as a print P. In the illustrated case, the image processing section 320 transfers the image data to the acquiring section 310 and receives the accessory information obtained in the acquiring section 110. The accessory information is then transferred to and stored in the DB 308 together with the image data.

The user terminal 306 comprises a display section 324 that can display the image; an input section 326 that inputs the searching condition, image, symbol, language, or information for print order; and an interface (I/F) 328 that transfers the image, searching condition or order information to the searching apparatus 302. The searching section 314 in the searching apparatus 302 includes an I/F 315 for receiving an image or various kinds of information from the I/F 328 of the user terminal 306.

The acquiring section 310 in the searching apparatus 302 comprises a tablet 330, an input subsection 332, a speech recognizing subsection 334, an extracting subsection 336, and an accessory information setting subsection (which is hereunder simply referred to as setting subsection) 338. The tablet 330 inputs freehand the outline of the specific information including specific geometric figures, specific subjects, message information, personal information consisting of the facial image of a specific person. The input subsection 332 inputs the outline of the specific information including the specific geometric figures, specific subjects, message information, personal information consisting of the facial image and the name of a specific person, and editing data of the CG image, and the meaning of the specific information comprising the audio information by means of GUI (graphical user interface) with the keyboard and the mouse, and optionally recognizes and inputs the meaning of the message information, or inputs the photographing information that is relevant to the time when the image was taken and the map information in order to extract the specific information that accompanies the image, as exemplified by the place where the image was taken, or the name of the subject, and the position of the subject on the map, as well as the position information, map information and camera information that are relevant to the time when the image was taken in order to derive the specific information including the information on the distance of the screen having the photographed image, directly from the camera used in taking the image, or by the operator's operation using the keyboard and the mouse. The speech recognizing subsection 334 inputs the audio information that accompanies the image or the audio information of the specific information that is found in the image, recognizes the meaning thereof, and converts the thus recognized meaning to the specific information recognized by letters. The extracting subsection 336 uses the outline of the specific information input from the tablet 330, the input subsection 332 and the speech recognizing subsection 334, and various kinds of information at the time when the image was taken, to extract the specific information from the image data of the image received from the image processing section 320 of the photoprinter 304. The setting subsection 338 sets from the specific information extracted in the extracting subsection 336, the specific information per se or the related information, for example, the recognized specific information including the message information and the audio information; the related information including the position, size, direction, color, presence or absence and direction in which the specific information is moved (direction of its motion vector) in the case of an animation image for the specific information including specific geometric figures, specific subjects, and personal information consisting of the facial image and the name of a specific person; the specific information per se including the editing data of the CD image; the specific information per se including the message information and audio information recognized in the speech recognizing subsection 334 and the input subsection 332; the specific information per se including the place where the image was taken, or the name of the subject, and the position of the subject on the map; and the specific information per se including the information on the distance of the screen having the photographed image as the accessory information to be stored in the DB 308. The thus set accessory information is then transferred to the image processing section 320 in association with the image data. It should be noted here that the map information may be previously stored in a database (not shown) within or outside the extracting subsection 336 or in the DB 308 so that the stored information can be read as required.

Therefore, the image processing section 320 of the photoprinter 304 transfers the image data of the image of interest together with the accessory information transferred from the setting subsection 338 of the acquiring section 310 to the DB 308, where the image data and the accessory information are as such stored. The image data to be transferred from the image processing section 320 to the extracting subsection 336 and/or the DB 308 may be the one before image processing or the processed one. Both image data may be identical to or different from each other. The image data that is not processed yet may be transferred from the image input section 318.

In the case of a CG image, editing data that is appendant to the image data as the accessory information may be directly transferred from the CG image creating device 317 to the setting subsection 338. Alternatively, the image data and the appendant editing data may be directly transferred from the CG image creating device 317 to the DB 308.

Instead of the photoprinter 304, another photoprinter, an image reading apparatus (scanner), an image processing apparatus or another image data supply source such as a driver of an image data recording medium may be used to receive the image data for acquiring the accessory information in the acquiring section 310 and the image data for storing in the DB 308. Further, if two kinds of image data are derived from the same image, one may be received from the photoprinter 304, the other from another image data supply source.

The designating section 312 of the searching apparatus 302 uses the tablet 330, the input subsection 332 and the speech recognizing subsection 334 in the acquiring section 310 and the CG creating device 317 to designate as the searching condition at least a portion of the accessory information, for example the outline of the specific information per se such as the audio information and the message information; at least one of the related information such as the presence or absence of the specific information, position, size, direction, direction of its motion vector or color; and also designate as the reference data the information on the distance of the screen, for example the position or name of the place where the image was taken or the subject, the outline of the depth in each region of the screen, and the outline of the depth obtained by positioning a patterned subject in a virtual map space. The tablet 330, the input subsection 332, the speech recognizing subsection 334 and the CG creating device 317 used in the designating section 312 may be the same as or different from those used in the acquiring section 310 or the like. Further, the acquiring section 310 and the designating section 312 may not be separately provided, but one component may be shared to acquire the accessory information of the image data and designate at least one of the accessory information as the searching condition.

As a result of searching in the searching section 314, the image data read from the DB 308 is displayed on the display section 316 as an image, but the displayed image need not be highly precise, if the selected image can be confirmed. Therefore, the image data read from the DB 308 may of course be displayed as it is, but highly precise image may be displayed after processing has been performed in the image processing section 320 of the photoprinter 304, if the display section 316 can display this image. That is, the display section 316 may be shared for the searching apparatus 302 and the photoprinter 304. Further, in order to confirm the image data selected in the searching section 314, the image data may be directly transferred to the print output section 322 of the photoprinter 304 so that a print-can be output therefrom. Alternatively, this image data may be transferred to another printer or more simplified printer for print output.

In the image processing method of the invention, print reorder is possible in the presence of the print (hard copy image) P, even if there is no film F or image data recording medium R. If the specific information such as the specific figures and specific subjects has a pixel density (resolution) required for researching, the image data may be read from the print P with a scanner for reading a reflection original that is provided in the image input section 318 of the photoprinter 304, or with another separate scanner or more simplified scanner. In the latter case, the thus read image data can be then directly transferred to the extracting subsection 336 of the acquiring section 310. At that time, the specific information extracted in the extracting subsection 336 and/or the related information may be directly transferred to the searching section 314 as such or after having been converted to the accessory information in the setting subsection 338. In this case, the image data read from the DB 308 is also subjected to the extraction of the specific information. Then, the image data read from the DB 308 to the searching section 314 may be directly transferred to the extracting subsection 336 of the acquiring section 310.

In addition, when the degree of agreement of the specific information such as the specific figures and specific subjects in a plurality of images for which an order was made is calculated in the searching section 314, the result of extraction of the specific information in the extracting subsection 336 is preferably transferred to the searching section 314 directly.

The foregoing embodiments are given for illustrative purposes only and it should be understood that the invention is by no means limited to those embodiments and various improvements and design modifications are of course possible without departing from the spirit and scope of the invention.

As described above in detail, according to the first embodiment of the present invention, there can be realized an image searching method capable of efficient image search using as a key the shapes (e.g. specific geometric figures) of subjects (human individuals and physical objects) that are found in the original image, the specific subjects per se, or message information and audio information that were synthesized into or accompany the original image and, in addition, an image processing method that utilizes the image searching method or the specific information extracted from the original image can be realized according to the third embodiment of the invention.

Stated more specifically, the image searching method of the invention offers the first advantage that an image complying with the given instruction can be searched for by a simple way of giving instructions such as drawing a rough sketch of figures on a tablet or an image display device, inputting the names or symbols of figures from a keyboard or inputting these instructions by speech. Even if a person is to be searched for, an image that complies with the given instruction can be searched for by a simple way of giving instructions such as drawing on the tablet a rough sketch of the person per se or at least one element selected from among his or her position, size and direction or inputting from the keyboard the presence or absence of the person or at least one element selected from among his or her position, size and direction.

Secondly, if a person in a dynamically changing image is to be searched for, a dynamically changing image that complies with the given instruction can be searched for by a simple way of giving instructions such as roughly showing its initial position and the direction of its movement on the tablet or inputting them from the keyboard or by speech. As a result, when editing videos, images can be easily searched through by rough scene description.

Thirdly, if the images to be searched through have audio information, it may be used to search for an image that complies with the given instruction. Since dynamically changing images as well as static images can be searched through, search can be made not only from the movement of the subject but also from the contents of his or her speech, offering great benefits to the case of editing videos.

Fourthly, the facial image of the person to be searched for and his or her name are keyed to each other when they are transformed to accessory information and an image that complies with the given instruction can be searched for by making use of that information. For example, a photo full of memory can be easily searched for by using the name of a family member as a keyword. The images to be searched through include not only static images but also dynamically changing images, as well as images having audio information.

Fifthly, when searching through images having audio information, various kinds of audio information may be combined with each other. Again, the images to be searched through include not only static images but also dynamically changing images.

Sixthly, if the data for the creation and editing of the CG images to be searched through is used as accessory information, the volume of calculations that must be made in the process of searching through CG images can be sufficiently reduced to ensure rapid and precise searching for a CG image that complies with the user instruction. Needless to say, the CG images to be searched through may be static or dynamically changing. If dynamically changing CG images are to be searched through, specific figures or objects and their motion vectors (representing either their size or direction or both) are preferably designated as described above. When searching through images having audio information, various kinds of audio information may be combined with each other.

Seventhly, if text data such as letters or reference image data are used as message information that accompanies the images to be searched through, an image that complies with the given instruction can be searched for by a simple way of designation such as designating the characteristic values of letters per se, their colors, contents and the shape of handwriting or by another simple way of designation such as designating a reference image area from a plurality of preliminarily registered reference images or selecting one of the prepared pictorial patterns.

If the user wants to display an image as the result of searching, the area that complies with the designated searching condition(s), excepting motionless parts such as the background, may be displayed in preference to other areas. In another effective way, the area complying with the designated searching condition(s) may be displayed as enhanced over the other areas after it has been subjected to special image processing such as luminance enhancement or blinking.

When the desired image is to be displayed, it is preferred to check the performance of the display device and let it display the image after the image data has been processed to meet the specific performance of the display device. According to another effective approach, the areas that have been searched through are managed on the database area by area and the priority of reference in search mode or the image resolution for data storage is set in accordance with access frequency.

By applying the above-described image searching method, the image processing conditions adopted in the previous printing can be searched from the image submitted to the service bureau at the time of later printing and prints are produced that have high enough fidelity to satisfy the customer.

In an application of this image searching method, similar images are differentiated on the basis of their compositions, so its performance is less sensitive to the effects of color and density; as a result, there is no possibility that prints having extremely different colors and densities are produced from photographic films or captured image recording media of a single order and no customer will leave the service bureau dissatisfied.

As described above in detail, the present invention also offers the advantage of realizing an image searching method that is applicable when the customer wants to locate a desired image from a number of stored images and which enables easy image search by utilizing the position information, camera information and map information that are relevant to the time when the image was taken and which is added in association with the recorded image.

Thus, according to the image searching method of the second embodiment of the invention, an image that complies with the given instruction can be searched for on the basis of a designated searching pattern the user has input, typically with a mouse, on the screen of a terminal device or a like image display device or on the basis of the position information (latitude and longitude) about the subjects in the screen, their names (e.g. place name) and the like that have been input as searching information from a keyboard.

If the user adds a 2D layout of subjects to the input searching pattern, an image that complies with the given instruction can be searched for much more easily.

Remember that in principle the image searching method of the invention is applicable not only to static images but also to dynamically changing images.

What is claimed is:

1. An image processing method, comprising the steps of:
    extracting specific figures or specific subjects from each of a plurality of image frames within a single order;
    comparing the image frames by comparing positions and sizes of said specific figures or subjects;
    finding similar image frames that have degree of similarity of the positions and sizes of said specific figures or subjects being not lower than a predetermined value; and
    performing image processing of said similar image frames to yield prints that are finished to have quality within a predetermined range.

2. The image processing method of claim 1, wherein the prints are finished to have uniformity in finishing color.

3. The image processing method of claim 2, wherein the prints are further finished to have uniformity in finishing density.

4. An image processing method, comprising the steps of:
    extracting specific figures or specific subjects from a plurality of image frames within a single order, to generate accessory information;
    searching the plurality of image frames with at least a portion of the accessory information to find similar image frames that arc similar in positions and sizes of specific figures or specific subjects; and
    performing image processing of similar image frames to yield prints that are finished to have quality within a predetermined range,
    wherein the similar image frames comprises a first image frame and a second image frame, and
    a degree of agreement of at least a portion of accessory information of the first image frame and at least a portion of accessory information of the second image frame, is not lower than a predetermined value.

5. The image processing method of claim 4, wherein the prints are finished to have uniformity in finishing color.

6. The image processing method of claim 5, wherein the prints are further finished to have uniformity in finishing density.

7. The method of claim 4, wherein the position or size of specific figures are determined in relation to a position or size of specific figures in relation to another frame.

* * * * *